United States Patent

Stumpf

[15] 3,701,299
[45] Oct. 31, 1972

[54] APPARATUS FOR FORMING STACKS OF CLOTH WEBS WHICH ARE CUT TO LENGTH

[72] Inventor: Gunter Stumpf, 7421 Mehrstetten/Kreis Munsingen, Germany

[22] Filed: March 2, 1971

[21] Appl. No.: 120,162

[52] U.S. Cl. ................... 83/72, 83/155, 83/210, 83/277, 83/282, 83/365, 83/367, 83/372, 83/396, 83/409, 83/421, 83/650, 83/925 CC
[51] Int. Cl. ................................................ B26d 5/28
[58] Field of Search .......... 83/72, 210, 277, 155, 282, 83/365, 367, 372, 396, 409, 421, 650, 925 CC

[56] References Cited

UNITED STATES PATENTS

| | | |
|---|---|---|
| 847,536 | 3/1907 | Zimmerman ............ 83/650 X |
| 1,475,802 | 11/1923 | Dorman ...................... 83/277 |
| 1,546,918 | 7/1925 | Clarke ..................... 83/277 X |
| 1,868,226 | 7/1932 | Draher et al ................ 83/277 |

*Primary Examiner*—Frank T. Yost
*Attorney*—Waters, Roditi, Schwartz & Nissen

[57] ABSTRACT

Webs of material are withdrawn from superposed cloth rolls to form a stack of layers on a table. The stack is clamped and compressed in a clamping device and the stack is cut by a cutting mechanism. The cut ends of the stack are gripped in a carriage which travels on the table to pull the stack through the now open clamping device and withdraw the webs from the rolls. At a particular position, the carriage trips a switch and the stack is clamped and cut whereupon the cut stack is transported on a conveyor and the carriage returns to its initial position adjacent the cutting mechanism.

12 Claims, 7 Drawing Figures

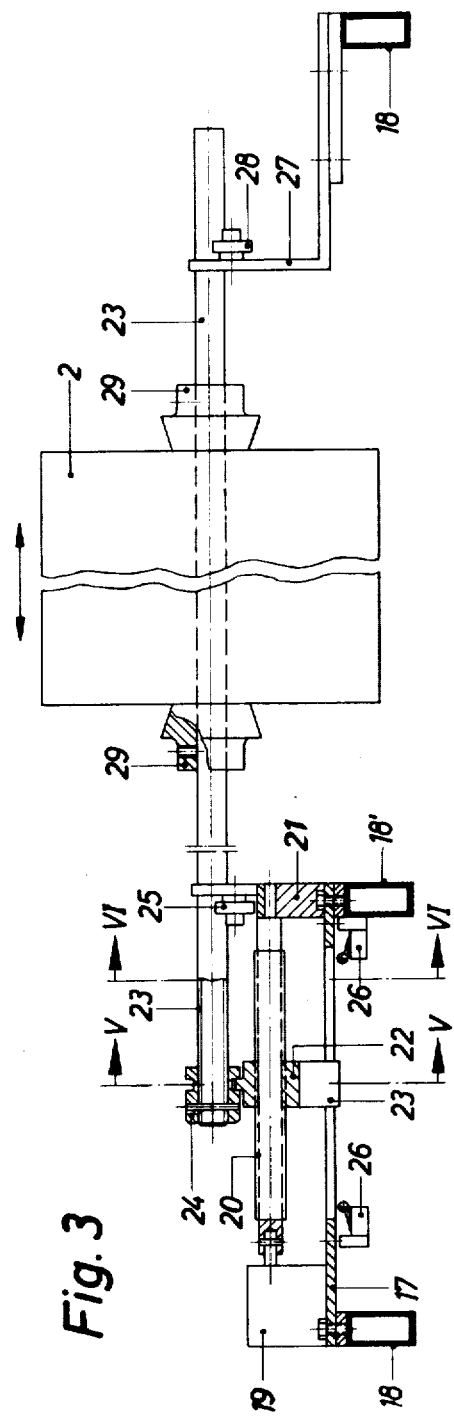
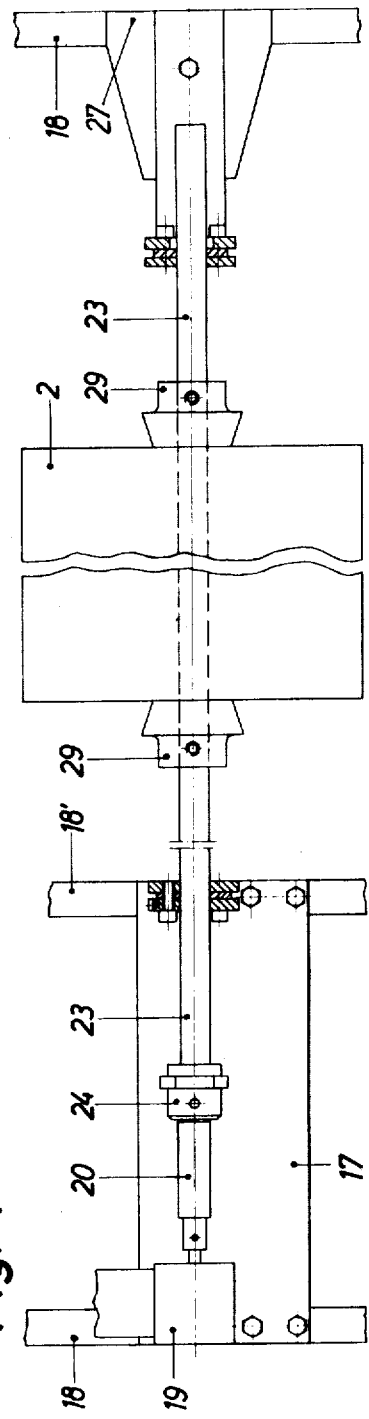

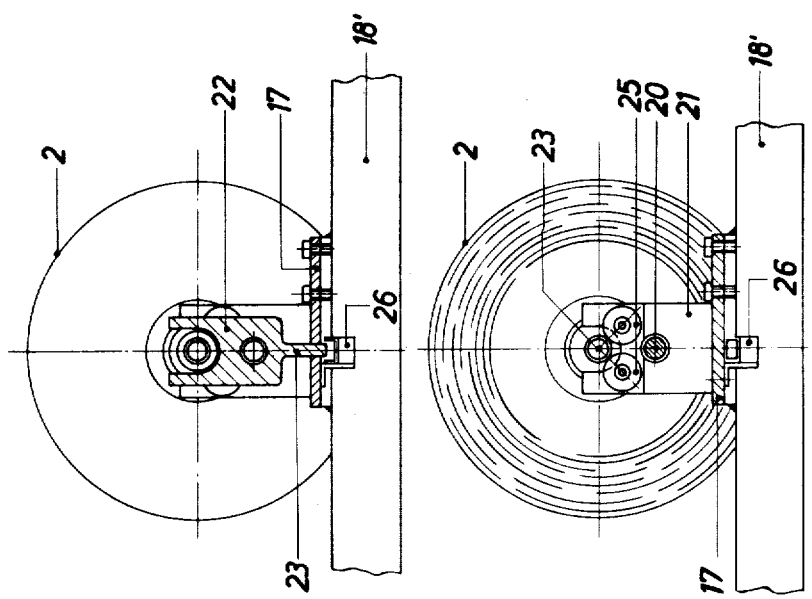

APPARATUS FOR FORMING STACKS OF CLOTH WEBS WHICH ARE CUT TO LENGTH

BRIEF SUMMARY OF THE INVENTION

The invention relates to apparatus for extracting a plurality of cloth webs from cloth rolls and advancing them by means of a conveyor belt to a working table for an operation such as stamping, marking, cutting or the like.

The invention seeks to provide apparatus to achieve a conventional layering operation with layering machines for certain fields of application, more especially for the processing of synthetic plastics, leather and industrial clothing materials. With conventional machines, to form a stack consisting of, for example, nine layers, the machine has to carry out nine "runs" over the length of the layers. Furthermore, after the exhaustion of a roll of cloth, the machine has to be reloaded each time, which necessitates a comparatively long period of time and results in a correspondingly long stoppage of the machine.

An object of the invention is to provide a means which achieves the same result, and which in the example under consideration is a stack of nine layers, by a single extraction.

According to the invention, the machine comprises a table-like frame provided between a storage means and a work table, said frame having two collecting rolls arranged at the height of the frame for guiding a plurality of cloth webs leaving the storage into a stack of layers. A motor-driven cutting device is movable transversely of the frame and a clamping device is arranged between the end of the frame and the cutting device for compressing the stack of layers before each cutting operation. A conveyor belt is incorporated in the frame, and an endless chain revolver with the conveyor belt at the same speed on one or both sides thereof. A withdrawal or extracting carriage is guided on upper rails on the frame and extends over the width of the belt, said carriage having a gripping device for gripping the cut edge of a stack of layers. A coupling serves for selectively coupling the carriage with the chain, and a limit switch at the other end of the frame serves the stop the movement of the carriage, the limit switch being adjustable to establish the required length of the stack of layers.

BRIEF DESCRIPTION OF THE DRAWING

FIG. 3 is a front elevation view showing details of the edge control means;

FIG. 4 is a top plan view of the edge control means shown in FIG. 3;

FIG. 5 is a section taken along line V—V of FIG. 3;

FIG. 6 is a section taken along line VI—VI of FIG. 3; and

DETAILED DESCRIPTION

Figure 1:
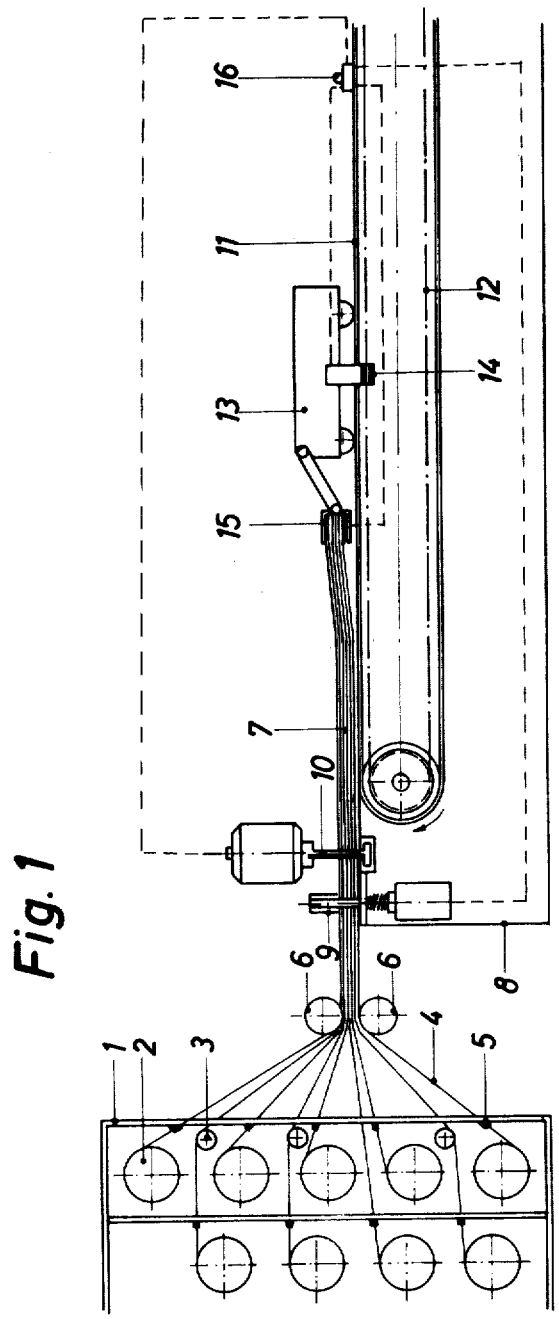
FIG. 1 is a side elevational view of the apparatus according to the invention.

FIG. 1 shows the apparatus according to the invention in association with a magazine or storage 1 for rolls of cloth. In the embodiment illustrated, the magazine contains nine rolls 2 of cloth in such an arrangement that cloth webs 4 guided over guide rollers 3 can be unwound smoothly from the rolls. Associated with each roll are photocell detectors indicated at 5 for scanning the edges of the web of cloth. These devices are of particular importance within the scope of the invention, since they alone make it possible for the longitudinal edges of all webs to lie in a common plane one above the other. The edge control means will be further described later.

Two collecting rolls 6 are arranged one above the other approximately at the height of table 8 to guide the cloth webs together to form a stack of cloth layers 7. From the collecting rolls, the layers of cloth are guided onto table 8, at the end of which, facing the magazine, is arranged a clamping device 9 extending transversely over the cloth webs. This clamping device, which preferably operates electromagnetically, serves the purpose of compressing the layers so that an adjacently disposed cutting mechanism 10, which can be moved transversely over the stack of layers and has a vertically movable impact knife or guillotine, provides a smooth cut edge for the stack. Immediately adjoining, provides a smooth cut edge for the stack. Immediately adjoining the cutting mechanism is the beginning of a conveyor belt 11 which extends in the table 8 and is driven by an electric motor (not shown) in a direction as indicated by the arrow. An endless chain 12 travels in the same direction and at the same speed as the conveyor belt at least at one of the sides thereof, said chain serving for the intermittent driving of a withdrawal carriage 13 which is guided on upper longitudinal rails on the table. The carriage 13 extends transversely over the width of the conveyor belt. The carriage can be coupled with or released from the endless chain by means of a coupling 14. The carriage is provided with a clamping member 15 which can be swung laterally over the stack 7 to grip the cut edge of the stack and pull the stack when the conveyor belt and chain are operated and the coupling 14 is operative.

The apparatus operates as follows:

After the separate webs of cloth have been threaded in guide rollers 3 and collecting rollers 6 to form the stack of layers, this stack is guided under and through the clamping device 9 until it extends beyond the cutting plane of the cutting mechanism 10. By actuation of the clamping device, the stack is clamped tightly and, by operating the cutting mechanism, the stack is cut to length with the leading ends of the individual layers exactly one above the other. The withdrawal carriage which has been uncoupled from the endless chain 12, is pushed to the left and grips the stack at its cut edge by its clamping member 15. The clamping device 9 is now release and the withdrawal carriage is coupled to the endless chain and the conveyor belt is actuated.

FIG. 1 shows the position of the stack 7 on the conveyor belt after a comparatively short time of travel of carriage 13. The stack is pulled further to such an extent that a limit switch 16 is tripped by the carriage to stop the conveyor belt 11, close the clamping device 9 and initiate the cutting operation by cutting mechanism 10. The switch 16 is adjustable in longitudinal position to regulate the length of the stack of layers to be cut. The switch 16 is diagrammatically indicated as connected to the clamping device 9, and cutting mechanism 11 to achieve the above functions, it being obvious to those skilled in the art as to the details by which this is achieved.

After completing the cutting operation, the carriage is disengaged from chain 12, the clamping device 15 is released and is swung above the stack of layers, so that the conveyor belt can now continue to transport the stack 7 for further operation thereon, e.g., stamping. etc. Here again, the switch 16 is indicated diagrammatically as being connected to the coupling 14 and clamping device 15 to control the operation thereof as indicated hereinabove, it being obvious to those skilled in the art as to the details by which this is achieved. In order that the withdrawal carriage 13 does not interfere with the travel of the stack, the carriage is constructed of two side portions and an upper connecting portion, the stack being able to pass between the side portions and below the upper portion. The carriage is then again displaced to the left. In order that the carriage will automatically travel to the left after release of coupling 14, the upper frame rails on the table may be inclined downwardly to the left. The same operation can if desired also be effected in a completely automatic manner.

In the withdrawal of several webs of cloth from a cloth roll magazine, it is very important, as already mentioned, that the edges of the cloth webs, subsequently to be stacked, be exactly one above the other. For this purpose, and as indicated in FIG. 1 at 5, each roll of cloth has associated therewith at least one photocell detector in which the light source is in one branch of a fork and the photocell is in the other parallel branch, the edge of the cloth web passing between the branches in a manner well known and not requiring further elaboration whereby the edge of the web is scanned to produce pulses when the web fails to block the light from the source to the photocell. The pulses of these detectors respectively control a geared motor, which causes a limited axial displacement of an associated roll-supported rod carrying the roll, in a direction such that all the rolls in a magazine are exactly aligned relative to one another.

Figure 2:
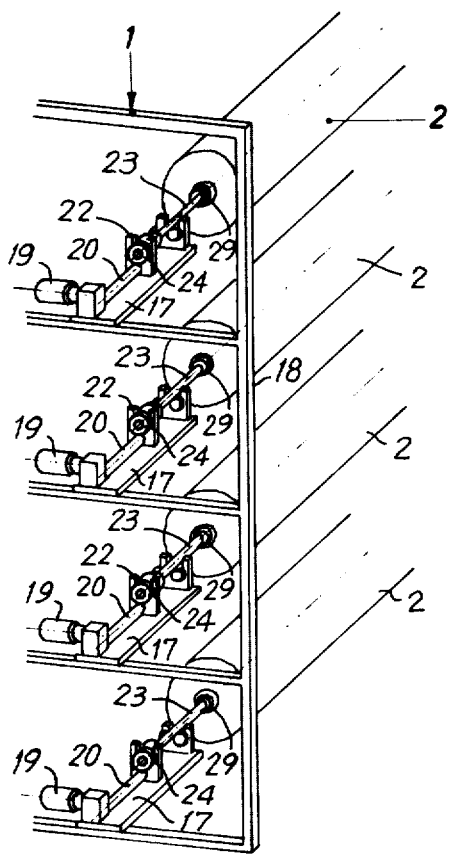
FIG. 2 is a perspective view of a detail of a cloth roll magazine with a control for guiding the edges of each roll.

By way of example, FIG. 2 diagrammatically shows four cloth rolls 2 mounted vertically one above the other in magazine 1 with the mechanical components which serve for actual edge control, these components being shown in detail in FIGS. 3 to 6.

Referring to FIGS 3 to 6 these components are arranged on a support or bracket 17, which is fixed on an outer magazine frame 18 and an inner frame 188'. The support 17 serves to carry a geared motor 19 driving a threaded spindle 20, the other end of which is mounted in a flange 21 fixed on inner frame 18'. Fitted on the threaded spindle 20 is a conveying nut 22 with a nose 23, which is guided at its lower edge in a longitudinal groove in the support 17. At the tip, the nut is shaped in the form of fork as seen in FIG. 5, and the fork engages in an annular groove in a coupling ring 24 fixed on the left-hand end of a cloth roll supporting rod 23. The left portion of the supporting rod 23 is mounted in a forked extension of the flange 21, which extension is provided with two supporting rollers 25 for the mounting of the rod. Arranged at both ends of the longitudinal groove in the support 17 is a limit switch 26 for limiting the travel of the conveying nut 22 which is moved axially when the geared motor 19 is actuated. Serving for the mounting of the right end of the supporting rod 23 is an L-shaped support member 27 whose horizontal arm is fixed to the magazine frame 18, while its vertical arm is of fork-shape and is provided with two supporting rollers 28. Two parts 29, which have conical outer surfaces fix the position of the roll of cloth 2 on the supporting rod 23.

Figure 7:
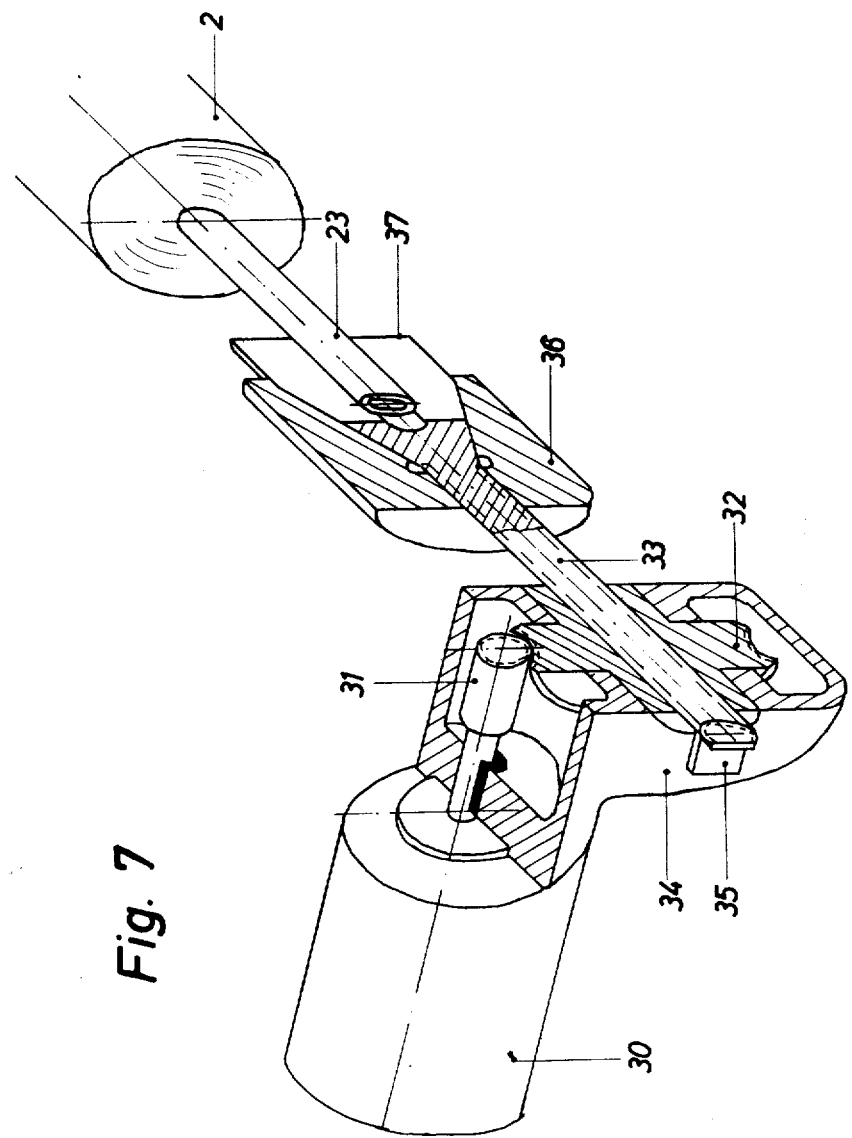
FIG. 7 is a perspective view, partly broken away and in section of another type of edge control means.

FIG. 7 shows another embodiment of the edge control. Instead of the geared motor provided in the arrangement as previously described, there is utilized a worm gear motor 30 having a driving worm 31 which meshes with a worm wheel 32 threaded on a threaded spindle 33 to drive the spindle forwardly or rearwardly, depending on the direction of rotation of the motor, a stop 35 provided on the gear housing and bearing against a flanged end of spindle 33 preventing the threaded spindle 33 from turning. Screwed on the other end of the threaded spindle is a clamping nut 36 with a slotted collet 37, into which extends the end of the supporting rod 23 for the roll of cloth. The inserted supporting rod is clamped by tightening the clamping nut 36.

What is claimed is:

1. Apparatus for extracting cloth webs from a plurality of cloth rolls to form a cut stack thereof, said apparatus comprising a magazine, a plurality of cloth rolls supported in said magazine so that webs of the cloth can be unwound from the rolls in superposed relation, a table adjacent the magazine for receiving the webs from the rolls, means for guiding the webs from the magazine to collect the webs in a stack at the level of said table, clamping means on said table for clamping the stack thereon and compressing the same, cutting means on said table for cutting a clamped stack on the table, a first conveyor means incorporated in said table for advancing a cut stack, a second conveyor means adjacent the first conveyor means and driven in the same direction and speed thereas, a carriage mounted on said table for displacement adjacent said first conveyor means for movement in the same direction as said first conveyor means and in a direction opposite thereto, gripping means on said carriage for gripping the stack at the cut edges thereof, coupling means for selectively connecting the carriage and second conveyor means in driving relation, and switch means in the path of the travel of the carriage for being activated thereby for controlling the length of the stack cut by the cutting means.

2. Apparatus as claimed in claim 1 wherein said first conveyor means comprises a conveyor belt and said second conveyor means comprises an endless member at least at one lateral side of the conveyor belt, said carriage extending over the width of the conveyor belt.

3. Apparatus as claimed in claim 2 wherein said gripping means on the carriage is pivotably connected thereto to be raised above the level of the stack to permit passage of the stack on the conveyor belt, said carriage being constructed to permit passage therepast of the said stack on the conveyor belt.

4. Apparatus as claimed in claim 3 wherein said switch means is connected to the conveyor means, the cutting means and the clamping means to stop the conveyor belt, and actuate the clamping means and cutting means when the switch means is activated by the carriage whereby a given length of the stack will be pulled by the carriage and the stack will be cut to this given length.

5. Apparatus as claimed in claim 4 wherein said switch means is connected to said coupling means and the gripping means to uncouple the carriage, release the gripping means and pivot the latter out of the path of travel of the stack after the operation of the cutting means.

6. Apparatus as claimed in claim 5 wherein said carriage is freely slidable on said table so as to be returned, when uncoupled from the endless member, to its initial position adjacent the cutting mechanism to grip the next stack of webs to be advanced on the table.

7. Apparatus as claimed in claim 1 comprising means for scanning the edges of the webs withdrawn from the rolls and means for adjusting the relative axial positions of the rolls in response to the scanning of the edges to align the superposed edges of the rolls.

8. Apparatus as claimed in claim 7 wherein said means for adjusting the relative axial positions of the rolls comprises, for each roll, a rotatable horizontal threaded spindle, a transporting nut threaded on said spindle and secured against turning movement, and a cloth-supporting rod coupled to said nut for axial displacement therewith in opposite directions depending on the direction of rotation of the spindle.

9. Apparatus as claimed in claim 8 comprising a support means for said rolls, said transporting nut comprising a nose guided in a longitudinal groove provided in said support means and two parallel arms, and a coupling ring fixed on the cloth-supporting rod and having a circumferential groove receiving said arms.

10. Apparatus as claimed in claim 9 comprising a limit switch at each of the ends of the longitudinal groove for contact with said nose to limit axial movement of said transporting nut.

11. Apparatus as claimed in claim 9 wherein said support means comprises an outer frame at each of the ends of the support rolls and an inner frame, a support member between the inner frame and one outer frame for each roll, a drive means on each support member connected to one end of the spindle of the associated roll, a vertical flange on each support member supporting the other end of the spindle, and supporting rollers on said flange rotatably supporting the cloth-supporting rod adjacent the end thereof with the coupling ring.

12. Apparatus as claimed in claim 7 wherein said means for adjusting the relative axial positions of the rolls comprises, for each roll, a rotatable worm wheel having an inner thread, a horizontal threaded spindle threaded in said worm wheel and secured against turning movement for being displaced in opposite directions depending on the direction of rotation of the worm wheel, a cloth-supporting rod in alignment with said spindle, a clamping nut on said spindle and a slotted collet disposed in said nut for insertion of said cloth-supporting rod, said collet causing clamping of the said rod by tightening of the clamping nut.

* * * * *

UNITED STATES PATENT OFFICE
CERTIFICATE OF CORRECTION

Patent No. 3,701,299           Dated October 31, 1972

Inventor(s) Gunter Stumpf

It is certified that error appears in the above-identified patent and that said Letters Patent are hereby corrected as shown below:

On the cover sheet in the heading, insert -- [30] August 5, 1970     Germany     P 2039024.3 -- .

Signed and sealed this 20th day of March 1973.

(SEAL)
Attest:

EDWARD M. FLETCHER, JR.           ROBERT GOTTSCHALK
Attesting Officer                     Commissoner of Patents